United States Patent [19]

Lipo et al.

[11] Patent Number: 5,376,851
[45] Date of Patent: Dec. 27, 1994

[54] VARIABLE RELUCTANCE MOTOR WITH FULL AND SHORT PITCH WINDINGS

[75] Inventors: Thomas A. Lipo; Feng Liang, both of Madison, Wis.

[73] Assignee: Electric Power Research Institute, Inc., Palo Alto, Calif.

[21] Appl. No.: 884,162

[22] Filed: May 18, 1992

[51] Int. Cl.$^5$ .................................. G01B 7/14
[52] U.S. Cl. ........................... 310/179; 310/185; 310/155; 310/197; 318/254
[58] Field of Search .............. 310/49 R, 122, 106, 310/112, 155, 197, 168, 156, 185, 179, 181, 674, 182; 318/701, 254, 138

[56] References Cited

U.S. PATENT DOCUMENTS

| | | | |
|---|---|---|---|
| 3,950,663 | 4/1976 | Mead | 310/49 R |
| 4,081,703 | 3/1978 | Madsen et al. | 310/49 R |
| 4,097,754 | 6/1978 | Farr | 310/67 R |
| 4,321,518 | 3/1982 | Akamatsu | 318/701 |
| 4,348,605 | 9/1982 | Torok | 310/168 |
| 4,631,510 | 12/1986 | Nagarkatti et al. | 336/135 |
| 4,670,696 | 6/1987 | Bryne et al. | 318/701 |
| 4,733,117 | 3/1988 | Perrins | 310/162 |
| 4,752,707 | 6/1988 | Morrill | 310/184 |
| 5,173,651 | 12/1992 | Buckleg et al. | 310/106 |

*Primary Examiner*—William M. Shoop, Jr.
*Assistant Examiner*—John W. Cabeca
*Attorney, Agent, or Firm*—Leonard Bloom

[57] ABSTRACT

A variable reluctance drive system including a motor and corresponding converter for improved current commutation is described. The motor incorporates a salient pole rotor and a salient pole stator having one or more full pitch windings which operate by mutual inductance to transfer the current from the active short pitch winding following phase alignment. This increases output torque and/or speed and permits a number of simple and economical converter circuits.

5 Claims, 10 Drawing Sheets

Example machine parameters: $L_{max} = 55$ mH, $L_{min} = 7.5$ mH, $R = 2.18$ Ω
Example speed: 20,000 rpm Example machine parameters: $L_{max} = 55$ mH, $L_{min} = 7.5$ mH, $R = 2.18\ \Omega$
Example speed: 20,000 rpm Example machine parameters: $L_{max}$ = 55 mH, $L_{min}$ = 7.5 mH, R = 2.18 Ω
Example speed: 1,000 rpm

VARIABLE RELUCTANCE MOTOR WITH FULL AND SHORT PITCH WINDINGS

BACKGROUND OF THE INVENTION

1. Field of the invention

The present invention relates to variable reluctance machines and, more particularly, to a high specific output variable reluctance drive system incorporating a motor having one or two full-pitch windings for improving current commutation, and a special purpose solid state power converter.

2. Description of the Background

In variable reluctance motors, torque is generated by a rotor and stator which tend to align themselves in order to reach a position of minimum magnetic reluctance. Such motors are simple, efficient, easily controlled, inexpensive, and safe. As a result, there have been significant efforts to develop commercial applications. One evolving application is the stepping motor, which delivers an incremental rotation as the result of a pulsed input. Stepping motors are now widely used in microprocessor and digital control systems, and other systems requiring a low output incremental drive.

Variable reluctance motors have also found limited use in higher power applications such as fan drives, pumps, traction systems, motion control systems, appliances, and general purpose variable speed drives. However, comparatively few industrial applications presently exist for higher power variable reluctance motors. Such industrial needs are satisfied by the more conventional DC and AC induction machines. This is because variable reluctance motors have a special problem: current commutation.

In a continuous drive variable reluctance motor, the current in each phase should be decreased to zero rapidly when the rotor becomes aligned with that phase. This prevents the development of negative torque. It is difficult to accomplish this instantaneous current reduction because the phase inductance is a maximum when the rotor is aligned with that phase. The problem is most serious when the speed of the motor is high.

The prior art uses one of the following two brute force approaches to reduce the current at alignment:

(1) a negative voltage is applied to the phase winding in order to extract the energy trapped in the magnetic field and transfer it to an external storage device such as a battery or capacitor; or (2) the phase is switched off before the rotor reaches alignment and the energy trapped in the magnetic field is dissipated in a resistor connected to the phase winding through a diode.

Unfortunately, the first technique increases the VA rating and cost of the switching device (a.k.a. converter). Also, the large back-and-forth energy flow between the motor and source causes extra motor and converter losses and creates a need for a large DC bus capacitor.

The second technique reduces the output torque and efficiency of the motor.

Such drawbacks account for the lack of commercial acceptance of switched variable reluctance motors.

It would be greatly advantageous to accomplish nearly instantaneous current reduction in a phase when the rotor is aligned with that phase without likewise increasing the cost of the converter or reducing the output torque of the motor.

SUMMARY OF THE INVENTION

It is, therefore, an object of the present invention to provide a variable reluctance motor and corresponding converter which permit an economical drive system with greater output torque and higher speed than conventional reluctance systems having equivalent frame dimensions and converter VA rating.

It is another object of the invention to improve current commutation in a variable reluctance motor using full pitch winding(s).

It is another object of the invention to eliminate the large back-and-forth energy flow between the motor and source, thereby reducing motor and converter losses and eliminating the need for a large DC bus capacitor.

The present invention accomplishes the above-described objects with a new approach wherein the current in the active phase winding is naturally transferred to another winding within the motor through mutual inductance between the two windings. This avoids the brute force approach of the prior art.

According to the present invention, the above-described and other objects are accomplished by providing a variable reluctance drive system. The system includes a motor comprising a rotor having four salient poles and a stator having six salient poles. In one embodiment, the stator is wound with three short pitch windings each comprising two short pitch coils wound around individual diametric stator poles and one full pitch winding wound around three adjacent stator poles. In a second embodiment, the stator is wound with two short pitch windings each comprising two short pitch coils wound around individual diametrically opposed stator poles and two full pitch windings each wound around a group of three different adjacent stator poles. Both embodiments improve current commutation by generating a mutual inductance between the full pitch winding(s) and the short pitch windings.

The variable reluctance drive system of the present invention also includes a converter for driving the above-described motor. Five alternative embodiments of a suitable converter are disclosed. All five embodiments generally comprise a plurality of switches including a first switch leg through a fourth switch leg each connected in parallel with a DC voltage source for applying the DC output to one of the short pitch windings or full pitch winding of the above-described motor.

The converter circuits achieve a novel method of commutating the variable reluctance motor of the present invention. The method comprises a first step transferring current in the active short pitch winding to a full pitch winding when the rotor reaches phase alignment, thereby improving the turn-off process, and a second step of transferring a part of the current in the full pitch winding to the next succeeding short pitch winding to be activated, thereby improving the turn-on process.

The variable reluctance drive system of the present invention is capable of a higher power density, higher speed capacity, lower converter VA rating, and higher efficiency.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT

Figure 1:
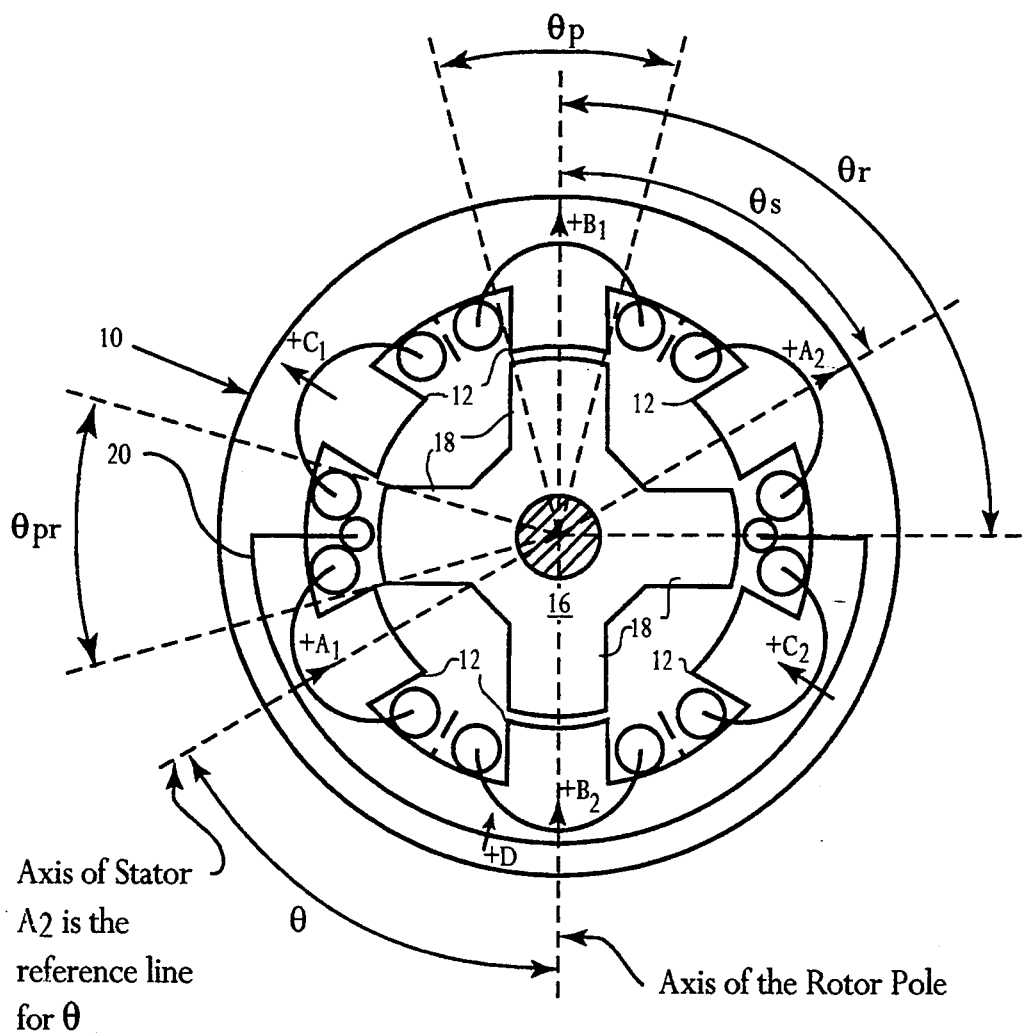
FIG. 1 is a cross-section of a preferred embodiment of the variable reluctance motor according to the present invention.

FIG. 1 shows a cross-section of a preferred embodiment of the present invention which incorporates a single full-pitch winding.

A stator 10 comprises a plurality of discrete laminated layers, each layer being punched to form six salient (or projecting) poles 12 positioned at angular intervals $\theta_s$ of $\pi/3$. Each pole 12 in FIG. 1 has a pole arc $\theta_{ps}$ of $\pi/6$.

The rotor 16 also consists of a plurality of discrete laminated layers each of which are punched to form four salient poles 18 positioned at angular intervals $\theta_r$ of $\pi/2$. Each pole 18 also has a pole arc $\theta_{pr}$ which is neither smaller than $\pi/6$ nor greater than $\pi/3$.

In the embodiment of FIG. 1, stator 10 is wound with three short pitch windings corresponding to three phases A–C. Each short pitch winding (for example, the winding of phase A) comprises two short pitch coils (A$_{1-2}$) connected in series and wound around a corresponding pair of diametric stator poles 12. The winding arrangement yields the following exemplary alternating phase sequence:

C → A → B → C → A → B

There is also a single full pitch winding 20 corresponding to a fourth phase D and wound around a group of three adjoining stator poles 12.

During motoring, a positive current is sequentially injected into each of the three short pitch windings of phases A–C some time before the inductance of the respective phase windings begins to increase. Likewise, the current is sequentially removed from each short pitch winding some time before the inductance of the respective short pitch winding begins to decrease.

There are three separate techniques for commutating the short pitch windings of phases A–C and the full pitch winding 20 of phase D to attain the above-described motoring operation. Assuming that phase B of FIG. 1 is the active short pitch winding, the three techniques may be described as follows.

1. A negative voltage is applied to the active short pitch winding (phase B in FIG. 1) and the full pitch winding 20 corresponding to phase D is short circuited. After the current in phase B reaches zero, the full pitch winding 20 of phase D can continue to be short circuited, or alternatively, may be connected to a negative voltage if the speed is very high. The full pitch winding 20 is then open circuited after the current flowing therein decreases to zero. In this manner, the main trapped energy can be visualized as being "pushed" from phase B to phase D by the negative voltage applied to phase B, and the energy in the leakage field is returned to the source.

2. A positive voltage is applied to the full pitch winding 20 and the active short pitch winding (phase B in FIG. 1) of phase B is short circuited. After the current in phase B decreases to zero, phase B is opened and the full pitch winding 20 is short circuited or connected to a negative voltage. After the current in the full pitch winding 20 decreases to zero, the full pitch winding 20 is open circuited. In this manner, the main trapped energy is "pulled" from phase B to phase D by the positive voltage connected to phase D and the energy in the leakage field is dissipated in the resistance of phase B.

3. A positive voltage is applied to the full pitch winding 20 and a negative voltage is applied to the active short pitch winding (phase B in FIG. 1) when phase B is turned off. When the current in phase B has decreased to zero, the full pitch winding 20 is short circuited or connected to a negative voltage. After the current in the full pitch winding 20 decreases to zero, the full pitch winding 20 is open circuited. In this manner, the trapped energy is both "pulled" by the positive voltage connected to phase D and "pushed" by the negative voltage connected to phase B from phase B to phase D.

Figure 2:
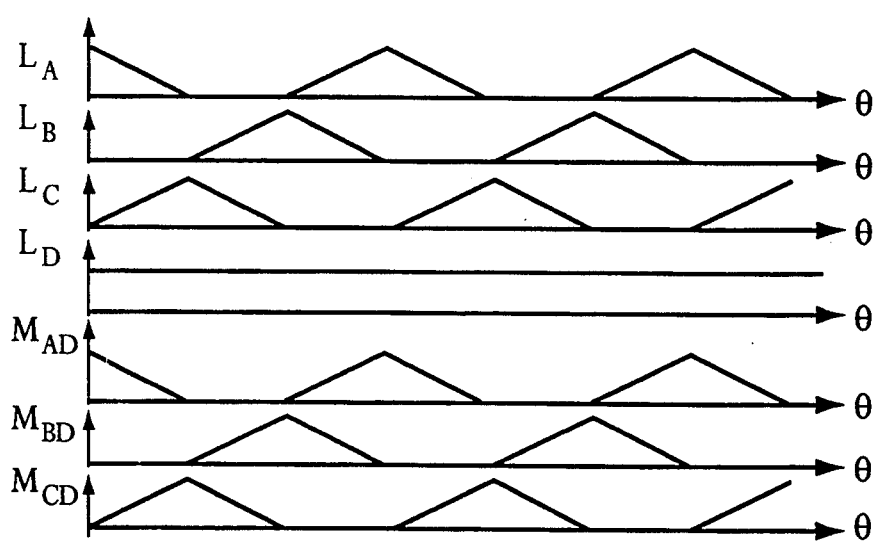
FIG. 2 shows the sequential inductance profile for the embodiment of FIG. 1.

FIG. 2 shows the sequential inductance profile for the embodiment of FIG. 1. As shown, the self-inductance of the full pitch winding 20 remains constant. Hence, the current in this winding can not produce any torque by itself. However, with this particular stator 10 and rotor 16 structure, the mutual inductances between each active short pitch winding and the full pitch winding vary with respect to rotor position. This allows the motor to attain a higher average torque output. Based on a linear model, the resulting additional torque is represented by the equation:

$$T = i_C i_D \frac{\partial M_{CD}}{\partial \theta}$$

when phase C and D are conducting.

Another factor which allows the motor of the present invention to attain a higher torque output is that the short pitch windings can be turned off later than those of conventional motors because of the improvement in turn-off performance.

Figure 3:
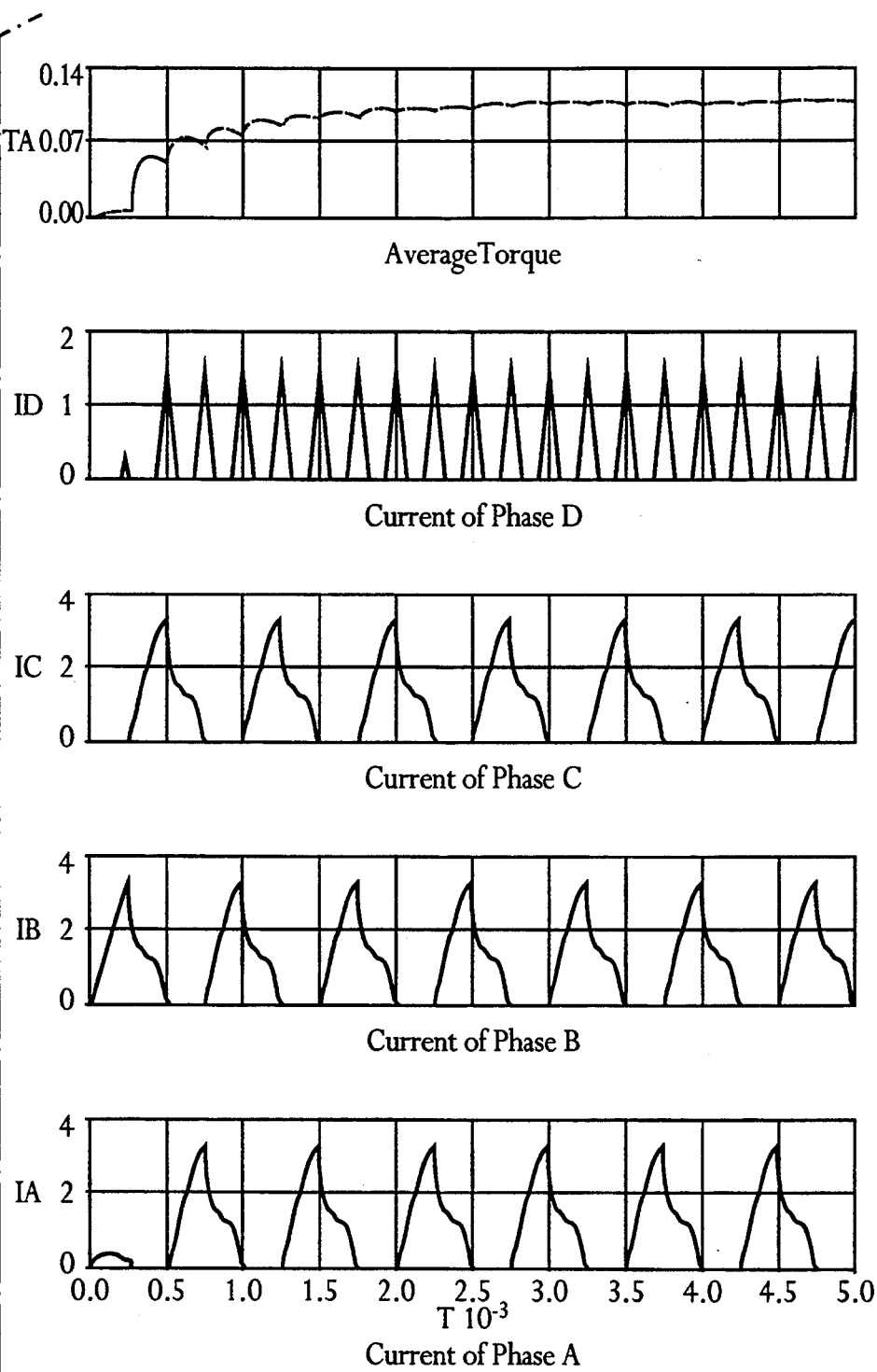
FIG. 3 is a graphical illustration of an exemplary current commutation sequence with respect to phases A–D for the embodiment of FIG. 1 at a speed of 20,000 rpm.

The operation of the embodiment of FIG. 1 using any one of the three above-described commutation techniques will now be described with reference to FIG. 3, which specifically illustrates an exemplary 20,000 rpm current commutation sequence of phases A–D. Referring to the graph corresponding to phase B, a positive current is injected into the short pitch winding of phase B some time before the inductance of phase B begins to increase. The current is subsequently removed from the short pitch winding of phase B some time before the inductance of phase B begins to decrease.

With the rotor and stator structure of FIG. 1, there exists a good magnetic coupling between the two phases B and D when the stator poles of the active short pitch winding (phase B in FIG. 1) are aligned with two of the rotor poles as shown in FIG. 1. Because of the magnetic coupling, the current in the short pitch winding of phase B is effectively transferred to the full pitch winding 20 of phase D. This remains true as long as any one of the three previously described techniques are used for commutating the short pitch windings of phases A–C and the full pitch winding 20 of phase D. Consequently, the current in phase B can be reduced more quickly following phase alignment. This is manifest in the current profiles for phases A–C shown in FIG. 3.

The turn-on performance can also be improved because part of the trapped energy is transferred to next active short pitch winding (phase C in FIG. 1) through the mutual inductance between the full pitch winding 20 and the short pitch winding.

Current commutation continues according to the repetitive sequence C → A → B → C → A → B. Each time current is almost instantly transferred to the full pitch winding 20 of phase D. The current transferred to the full pitch winding 20 of phase D will remain in phase D for a short time as it gradually decreases to zero.

Figure 5:
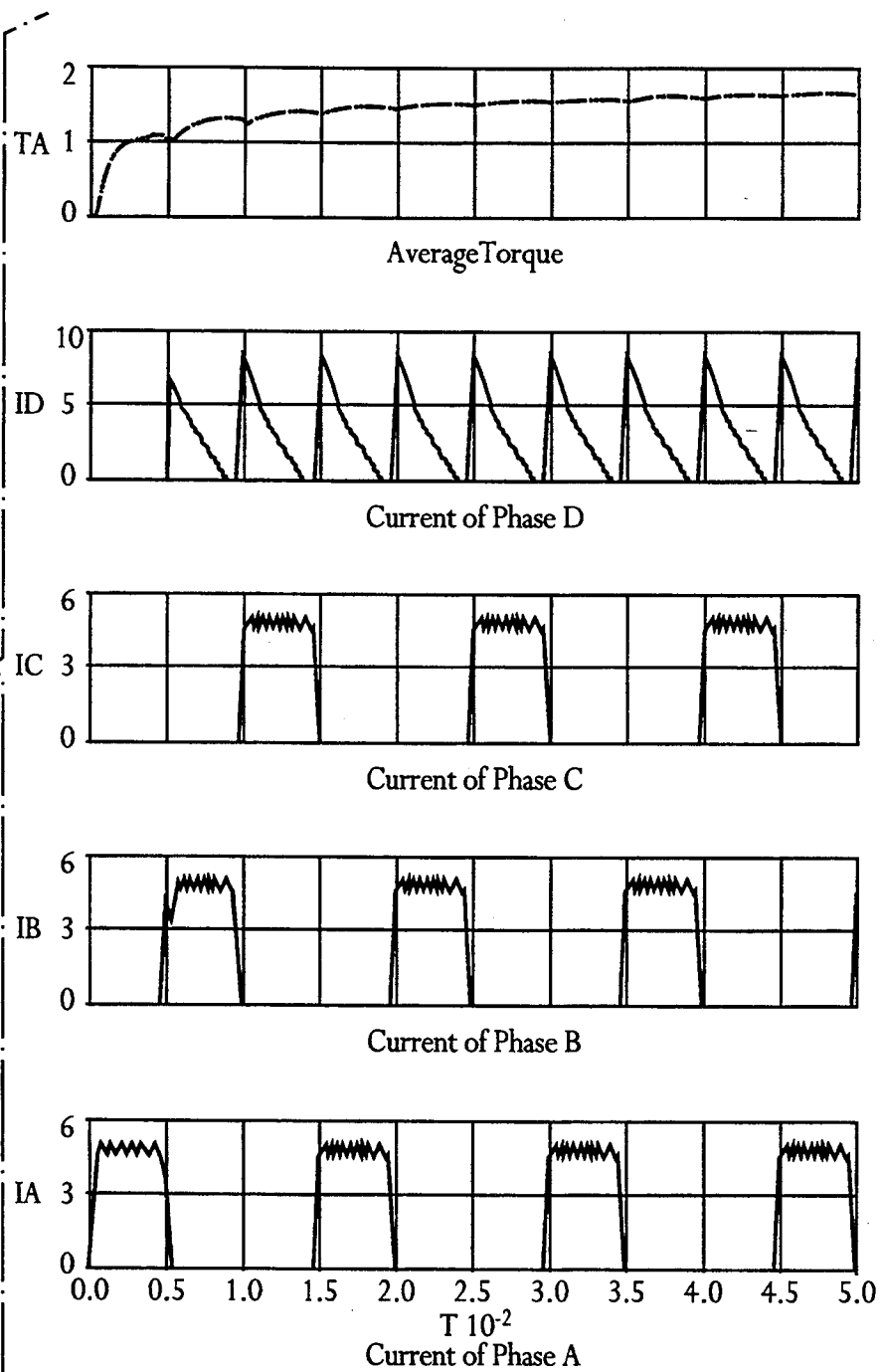
FIG. 5 is a graphical illustration of the current commutation sequence of FIG. 3 at an alternative speed of 1000 rpm.

If the VRM according to the present invention is to be operated at a speed which is below a predetermined base speed, the torque may be controlled by chopping the current applied to the short pitch windings of phases A–C to keep it at the desired value. For example, FIG. 5 illustrates an exemplary current commutation sequence for the embodiment of FIG. 1 when operated at 1000 rpm (below the predetermined base speed).

Above the predetermined base speed, the torque is controlled by controlling the conducting angle of each phase.

It is an essential feature of the present invention that the above-described stator 10 and rotor 16 structure results in a natural transfer of current from the active short pitch winding of phases A–C to the full pitch winding of phase D and on to the next sequential short pitch winding via the mechanism of mutual inductance. This natural transfer of current is an ideal alternative to the prior art brute force approaches (such as increasing the bus voltage or removing current from the active phase much prior to alignment) which attempt to extract magnetic energy outside of the machine.

Another feature of the present invention is the elimination of the back-and-forth energy flow between the motor and the power source which would occur if the magnetic energy were extracted outside of the machine. In the present invention the energy trapped in the magnetic field is retained in the motor. As a result, the DC bus capacitor can be smaller.

Figure 4:
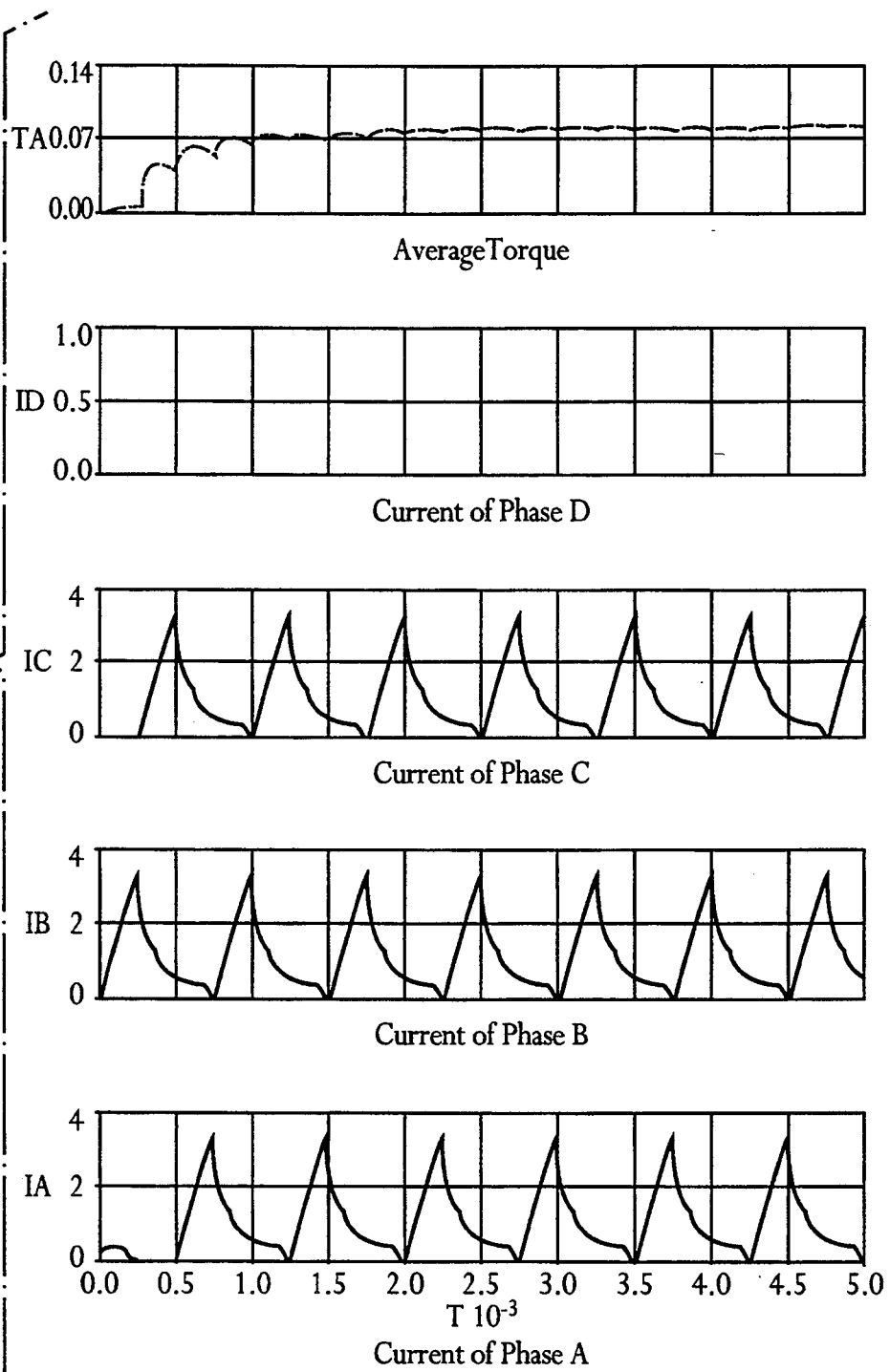
FIG. 4 illustrates a current commutation profile for a variable reluctance motor at a speed of 20,000 rpm which excludes the full-pitch winding 20 of the embodiment of FIG. 1.
Figure 6:
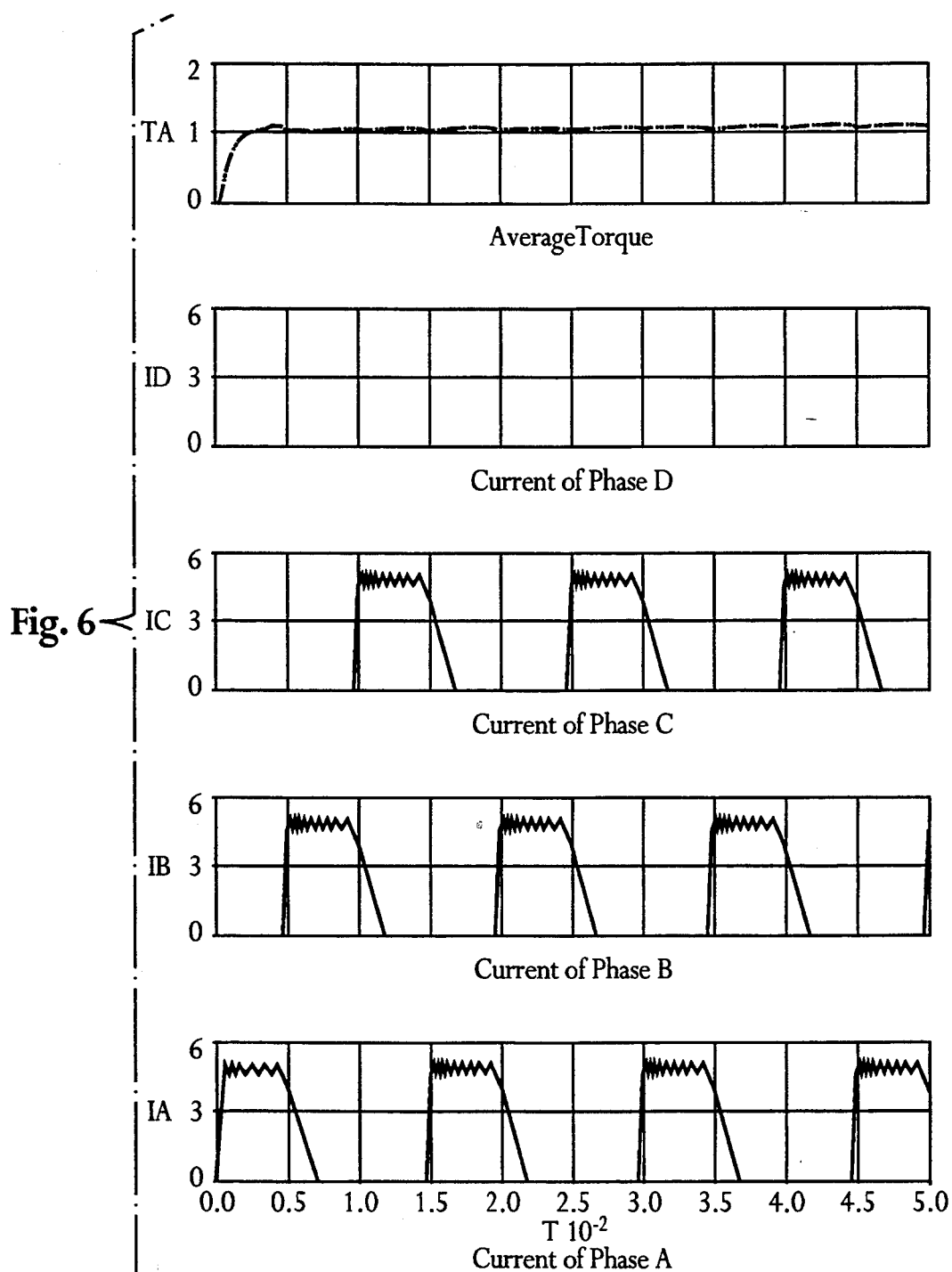
FIG. 6 illustrates a current commutation profile for the variable reluctance motor of FIG. 4 at a speed of 1000 rpm.

A comparative study of the commutation sequence and resulting torque output of the embodiment of FIG. 1 (shown in FIGS. 3 and 5, respectively) can be made with respect to FIG. 4 and FIG. 6, which respectively show commutation sequence and resulting torque output for a similar variable reluctance motor having an identical rotor and stator pole configuration but no full-pitch winding. It is clear in FIG. 4 and FIG. 6 that a considerable current remains in the short pitch windings of phases A–C after the respective phase alignments. Consequently, a lower overall torque output is generated.

It is noteworthy that the embodiment of FIG. 1 can be operated with reversed rotation simply by changing the current commutation sequence to:

A → C → B → A → C → B.

In addition, the embodiment of FIG. 1 can be operated as an efficient generator by sequentially injecting the positive current into the respective short pitch windings of phases A–C as the inductance of the active phase decreases. Furthermore, a positive voltage must be applied to the full pitch winding 20 some time before next short pitch winding is energized in order to build up magnetic field. After the next sequential short pitch winding becomes active, the full pitch winding 20 is short circuited or connected to a negative voltage. Through the mutual inductance between the full pitch winding 20 and the short pitch windings of phases A–C, the current decrease in the full pitch winding 20 will accelerate the current increase in the active short pitch winding.

FIGS. 7–11 illustrate five alternative converter circuits for implementing the commutation sequences necessary for driving the variable reluctance motor of FIG. 1.

Figure 7:
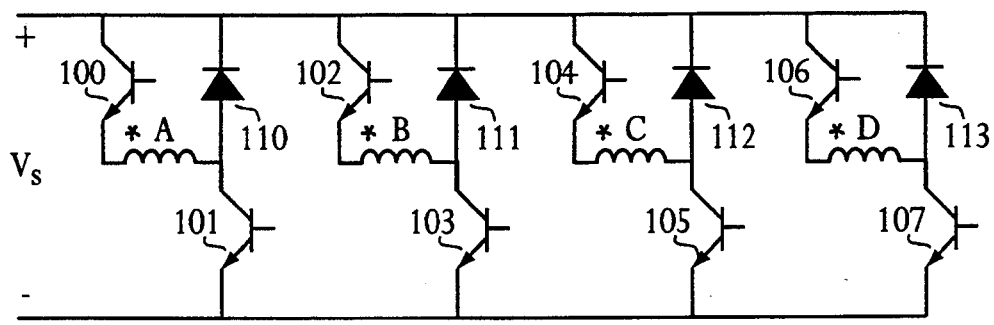
FIGS. 7–11 illustrate five alternative converter embodiments suitable for driving the variable reluctance motor of FIG. 1.

The converter configuration illustrated in FIG. 7 comprises four switch legs connected in parallel between positive (+) and negative (−) DC supply lines. Each switch leg comprises a pair of switch devices 100–101, 102–103, 104–105 and 106–107 with one of the four windings of phases A–D connected in series therebetween. In addition, each switch leg includes one of diodes 110–113 connected as shown between a terminal of the corresponding winding of phase A–D and the positive DC supply line.

During commutation, the pairs of switch devices 100–101, 102–103, and 104–105 are sequentially turned on before the inductance of the corresponding short pitch winding of phase A, B or C begins to increase. Turning on the respective switch devices 100–101, 102–103, and 104–105 injects a positive current into each of the corresponding short pitch windings of phases AC. Similarly, the switch devices 101, 103, and 105 are sequentially turned off before the inductance of the short pitch windings A–C begins to decrease. Turning off switch devices 101, 103 and 105 short circuits the corresponding short pitch winding of phase A, B or C through diodes 110–113. For example, switch 101 is turned off some time before the inductance of phase A begins to decrease. The short pitch winding of phase A is short circuited through switch device 100 and diode 110 after switch device 101 is turned off. Then switch devices 106 and 107 are turned on and a positive voltage is applied to the full pitch winding 20 of phase D. As a result, the current decrease in the short pitch winding of phase A is accelerated by the current increase in the full-pitch winding 20 of phase D. After the current in the short pitch winding of phase A decays to zero, switches 100 and 107 are turned off. After the current in the full-pitch winding 20 of phase D decays to zero, switch 106 is turned off.

FIGS. 8-11 show alternative converter circuits which generate similar current commutation sequences.

Figure 8:
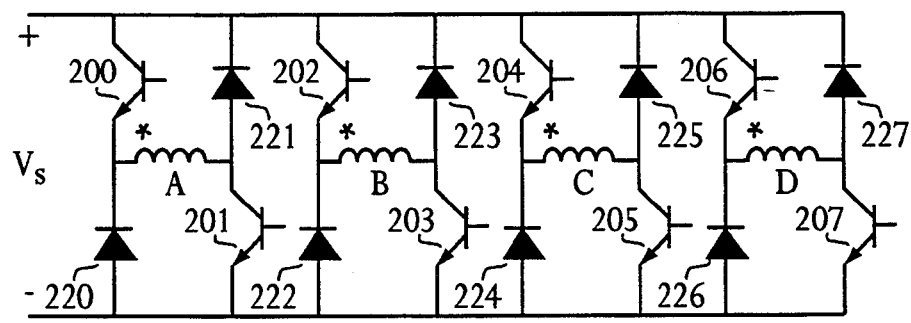

In the converter configuration shown in FIG. 8, each of the four switch legs comprises a pair of switch devices 200 & 201, 202 & 203, 204 & 205, and 206 & 207 having a corresponding one of the windings of phases A-D connected in series therebetween. The emitters of switch devices 200, 202, 204, and 206 are connected to the negative (−) supply line through corresponding diodes 220, 222, 224, and 226. The collectors of switch devices 201, 203, 205, and 207 are connected to the positive (+) supply line through corresponding diodes 221, 223, 225, and 227.

The above-described configuration of FIG. 8 can commutate the four windings of phases A-D by any one of the three techniques proposed in this invention. To apply a positive voltage to a phase winding, for example, phase A, the two switches 200 and 201 are turned on. To short circuit a phase winding, for example, phase A, either one of the two switches 200 or 201 is turned on and the other is turned off. To apply a negative voltage to a phase winding, for example, phase A, the two switches 200 and 201 are both turned off. The converter of FIG. 8 allows a faster current commutation because the active short-pitch windings of phases A-C can each be turned off with a negative voltage while a positive voltage is supplied to the full-pitch winding 20 of phase D. (If there is a good magnetic coupling between the active short pitch winding and the full-pitch winding 20, the current increase in one will cause a current decrease in the other due to the fact that the flux tends to be constant. Hence, applying a positive voltage to the full pitch winding 20 of phase D will accelerate the current increase in the full pitch winding 20. Consequently, the current decrease in the short pitch windings of phases A-C will be accelerated.)

Figure 9:
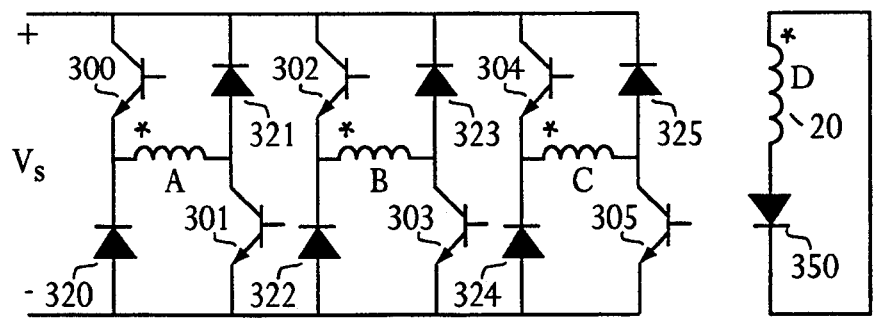

The converter configuration shown in FIG. 9 operates in much the same manner as that of FIG. 8. When an active short pitch winding is turned off, a negative voltage is applied to the active short pitch winding through the diodes 320-325 connected to the short pitch winding, and the full pitch winding of phase D is short circuited. For example, if switch device 300 and 301 are turned off in order to apply a negative voltage to the short pitch winding of phase A through the two diodes 320 and 321, then the induced voltage in the full pitch winding 20 will cause diode 350 to conduct and the full pitch winding 20 becomes short circuited through diode 350. The diode 350 blocks negative current in the full pitch winding 20 of phase D in order to prevent negative torque from being developed.

Figure 10:
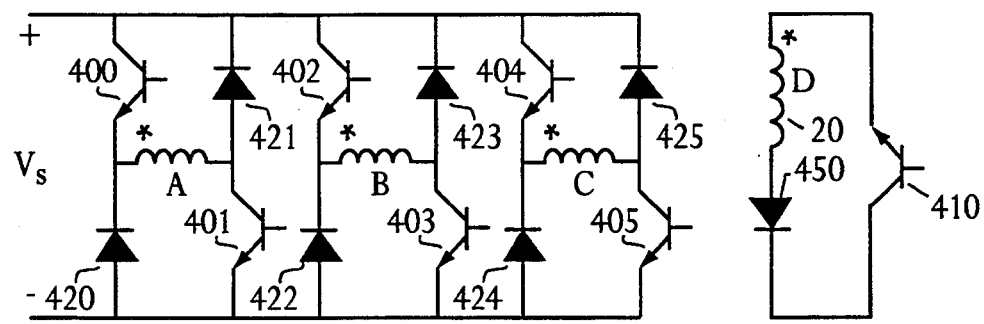

FIG. 10 illustrates a modification to the converter configuration shown in FIG. 9, and the operation of the converter of FIG. 10 is essentially the same as that in FIG. 9. To improve efficiency, switch device 410 is provided. Switch device 410 is turned on at the beginning of each current commutation period to short circuit the full pitch winding 20 of phase D. Switch device 410 is then turned off after the current in the full pitch winding 20 of phase D decays to zero and is kept off until the next current commutation begins. This way, full pitch winding 20 is not put into operation during the chopping periods of the short pitch windings of phase A-C, and as a result the efficiency of the variable reluctance motor is higher.

Figure 11:
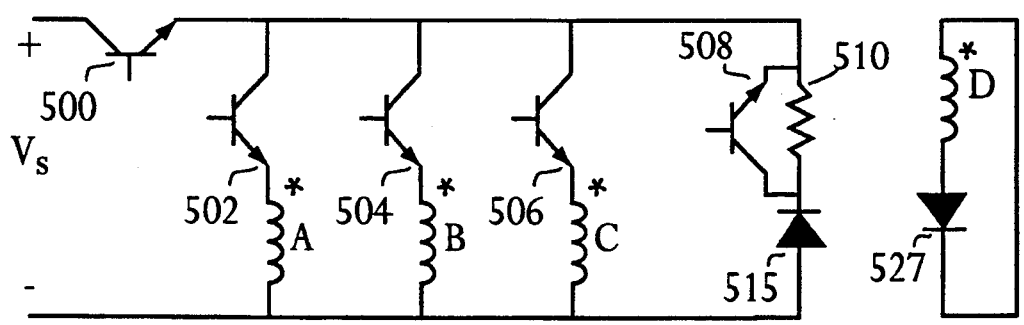

The converter shown in FIG. 11 comprises a DC voltage source $V_s$ which may be either a battery or a rectifier connected to an AC voltage source. The DC voltage source supplies positive (+) and negative (−) terminals. A switch device 500 is connected in series between the (+) terminal and four parallely connected switch legs. An isolated loop comprises a phase winding D and a diode 527. Three of the switch legs comprise one of switch devices 502, 504 and 506 connected in series with one of phase windings A-C. The fourth switch leg comprises diode 515 connected in series with a parallely connected switch device 508 and resistor 510.

During commutation, pairs of switch devices 500 & 502, 500 & 504, and 500 & 506 are sequentially turned on before the inductance of the corresponding winding of phases A, B, or C begins to increase and after the previous phase winding is fully turned off (the phase current reaches zero). Turning on the respective switch device pairs 500 & 502, 500 & 504, and 500 & 506 injects a positive current into the corresponding short pitch winding of phases A-C. When one of the three phases A-C needs to be turned off, switch devices 500 & 508 are turned off while the corresponding switch device 502, 504 or 506 is kept on. With switch device 508 being off, there is a voltage across the resistor 510 caused by the current in the active phase winding A-C. The voltage is a negative voltage which is needed to turn off the corresponding phase winding A-C, and it is applied to the winding A-C through diode 515 and the corresponding switch device 502, 504 or 506. During this turn-off process, the induced voltage in the phase winding D will cause diode 527 to conduct and the phase winding D becomes short circuited through diode 527. The diode 527 blocks negative current in the phase winding D in order to prevent negative torque from being developed. For example, if phase A needs to be turned off, then switch devices 500 and 508 are turned off while switch device 502 is kept on, and the current in phase A will flow through the resistor 510. As a result, a voltage drop will appear across the resistor 510, which voltage is applied to phase winding A through switch device 508 and diode 515. Current chopping may be realized by turning switch device 500 on and off repeatedly. To improve efficiency, switch device 508 is kept being on during the chopping process to prevent current from flowing through the resistor 510.

Figure 12:
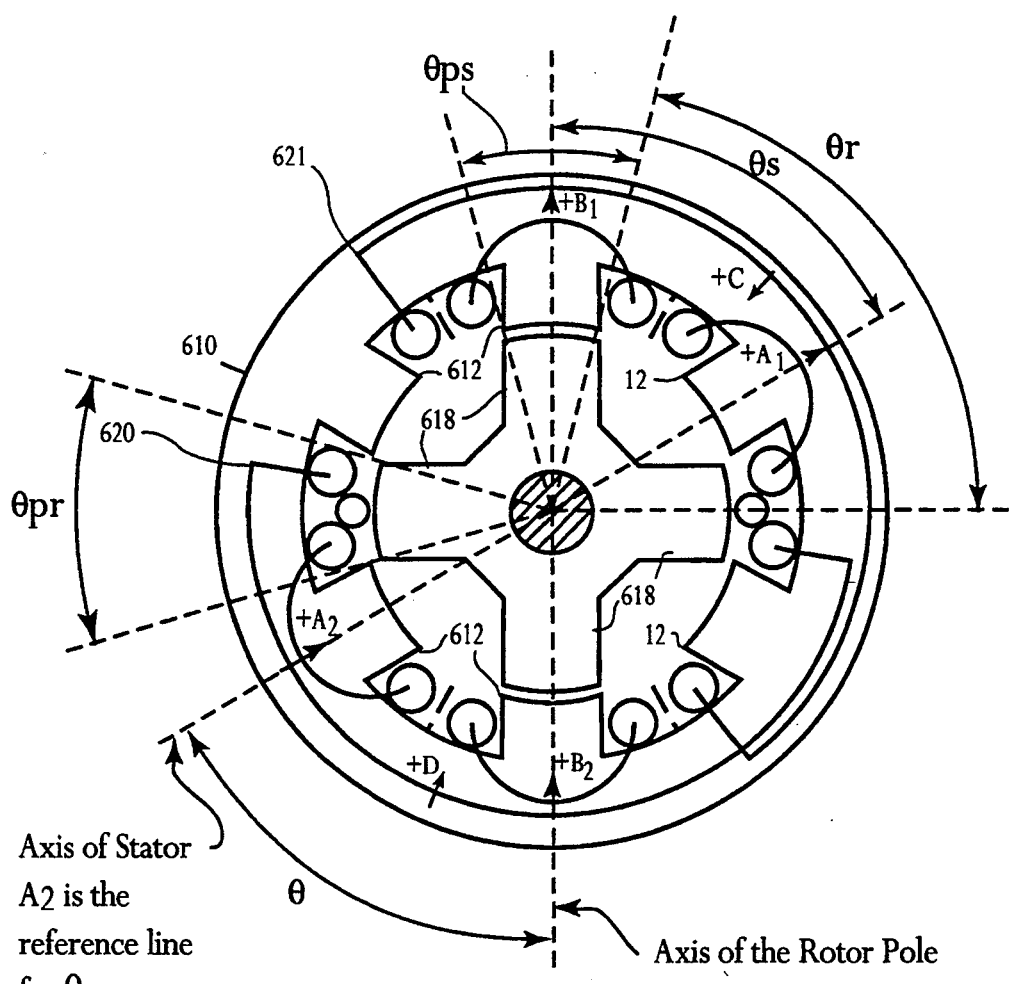
FIG. 12 is a cross-section of an alternative embodiment of the variable reluctance motor according to the present invention.

FIG. 12 illustrates an alternative embodiment of the variable reluctance motor of the present invention which incorporates two full pitch windings 620 and 621.

As shown in FIG. 12, the stator 610 comprises six salient (or projecting) poles 612 positioned at angular intervals $\theta_s$ of $\pi/3$. Each pole 612 has a pole arc $\theta_{ps}$ of $\pi/6$.

The rotor 616 also comprises four salient poles 618 positioned at angular intervals $\theta_r$ of $\pi/2$. Each pole 618 has a pole arc $\theta_{pr}$ with $\theta_{pr}$ being neither smaller than $\pi/6$ nor greater than $\pi/3$.

In the embodiment of FIG. 12, stator 610 is wound with only two short pitch windings corresponding to two phases A and B. Once again, each short pitch winding corresponding to phases A and B further comprise two short pitch coils, for example, coil $A_{1 \text{ and } 2}$ connected in series and wound around a corresponding pair of diametric stator poles 612 to yield an alternating phase sequence.

There is also a full pitch winding 621 corresponding to phase C and a full pitch winding 620 corresponding to phase D. The full pitch winding 621 corresponding to phase C is wound around a group of three adjoining stator poles 612 including those corresponding to phases A and B. Likewise, the full pitch winding 620 corresponding to phase D is wound around another group of three adjoining stator poles 612 including one which is also wound by the full pitch winding 620.

Current commutation for the embodiment of FIG. 12 is identical to that of FIG. 1 and the working principle is the same with one exception. The injecting of current in the full pitch winding 620 of phase D not only improves the current commutation of phase A–C, but also produces positive torque when phases C and D are energized and the mutual inductance between them is increasing.

Figure 13:
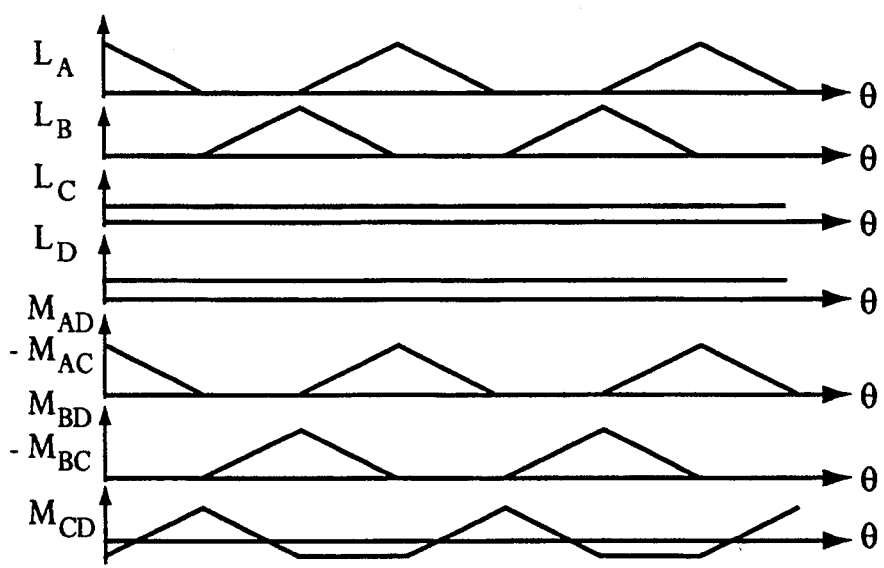
FIG. 13 shows the sequential inductance profile for the embodiment of FIG. 12.

As shown in FIG. 13, the inductance $L_D$ of the full pitch winding 620 remains constant. Hence, the full pitch winding 620 of phase D can not produce any torque by itself. However, the current in the full pitch winding 620 of phase D will, by mutual inductance, interact with the current in the full pitch winding 621 of phase C, and as a result, a torque will be developed. Specifically, if the current commutation sequence is CD → A → B → CD → A → B, commutation of phase A is the same as that of phase A in the embodiment shown in FIG. 1. However, the current commutation of phase B is different. After the current in phase B decreases to zero, the current in phase D is not decreased to zero as it is after phase A is turned off. Instead, the current in phase D is regulated at a desired value together with the current in phase C to produce torque. For phase C, it is turned on some time before the mutual inductance between phases C and D begins to increase and turned off some time before the mutual inductance begins to decrease. The current commutation of phase C is improved by the current in phase D. After the current in phase C is decreased to zero, the current in phase D will decrease to zero.

The general concept of the present invention is equally applicable to the field of linear motors, and each of the above-described rotary embodiments can easily be adapted to a linear configuration.

Figure 14:
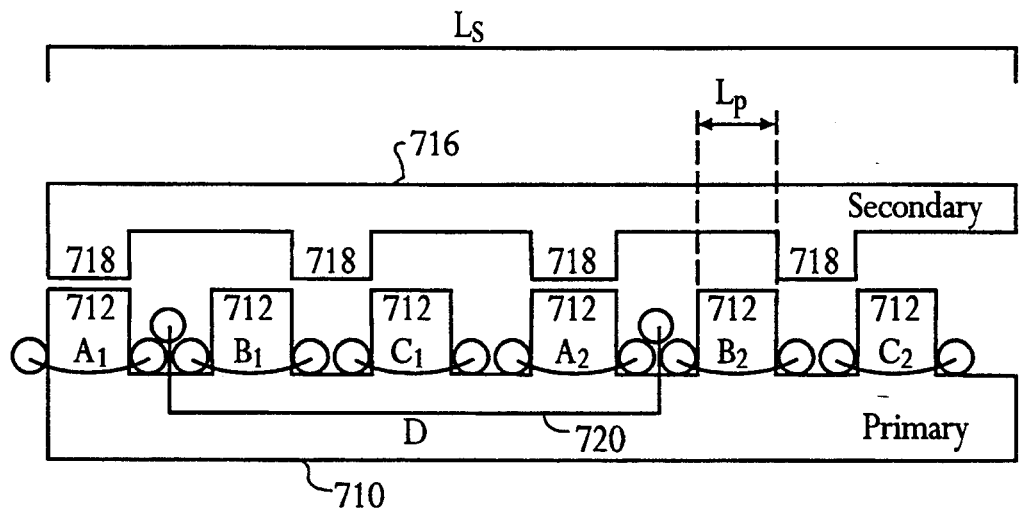
FIG. 14 illustrates one section of a linear embodiment which is a counterpart of the rotary variable reluctance motor of FIG. 1.

Specifically, FIG. 14 illustrates one section of a linear variable reluctance motor corresponding to the rotary embodiment of FIG. 1. Multiple sections may be combined to yield a linear variable reluctance motor of any length. The section of FIG. 14 includes a single primary 710 and a single secondary 716. The primary 710 has a number of salient poles 712, and secondary 716 has a number of salient poles 718. The poles 712 have a pole width $L_{pp}$ equal to $L_s/12$, and the poles 718 have a pole width $L_{ps}$ of between $L_s/12$ to $L_s/6$ where $L_s$ equals the total length of the section. The primary 710 is provided with six equally spaced salient poles 712, and the secondary 716 is provided with four equally spaced salient poles 718.

In the embodiment of FIG. 14, primary 712 is wound with three windings corresponding to three phases A–C. Each phase winding (for example, the winding of phase A) comprises two single-pole coils ($A_{1-2}$) connected in series and wound around a corresponding pair of poles 712.

There is also a single multi-pole winding 720 corresponding to a fourth phase D and wound around a group of three adjoining primary poles 712.

The commutating sequence, operation, and advantages of the linear variable reluctance motor of FIG. 14 are identical to those described with respect to the rotary embodiment of FIG. 1

Figure 15:
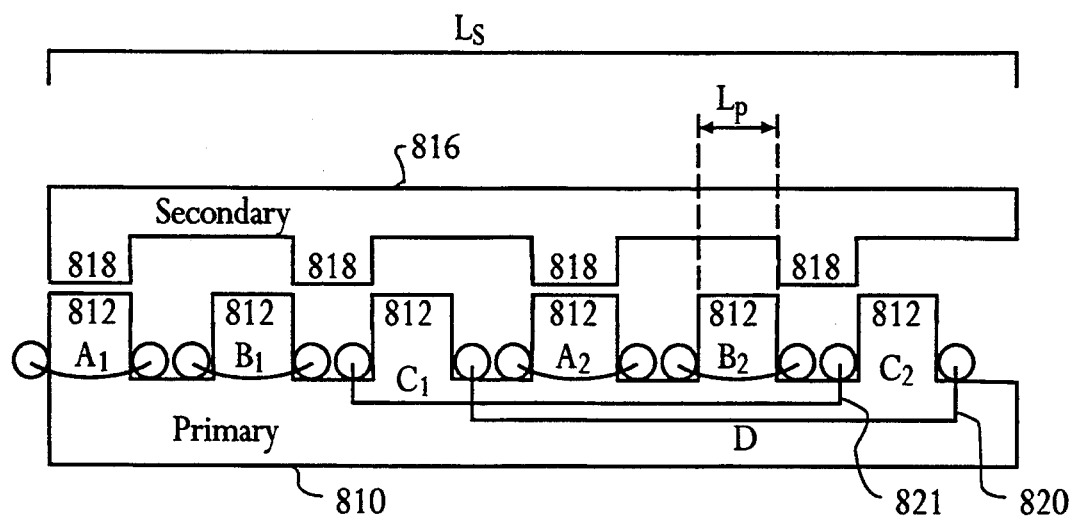
FIG. 15 illustrates one section of a linear embodiment which is a counterpart of the rotary variable reluctance motor of FIG. 12.

FIG. 15 illustrates one section of a linear variable reluctance motor corresponding to the rotary embodiment of FIG. 12. Again, multiple sections may be combined to yield a linear variable reluctance motor of any length. The section of FIG. 15 is structurally similar to that of FIG. 14, except that primary 812 is wound with only two phase windings corresponding to two phases A and B. Once again, each phase winding corresponding to phases A and B further comprises two single-pole coils, for example, coils $A_1$ and $A_2$ connected in series and wound around corresponding pair of primary poles 812 to yield an alternating phase sequence.

There is also a first multi-pole winding 821 corresponding to phase C and a second multi-pole winding 820 corresponding to phase D. The multi-pole winding 821 corresponding to phase C is wound around a group of three adjoining primary poles 812 two of which correspond to phases A and B. Likewise, the multi-pole winding 820 corresponding to phase D is wound around another group of three adjoining primary poles 812 including two which are also wound by the multi-pole winding 821 corresponding to phase C.

The commutating sequence, operation, and advantages of the linear variable reluctance motor of FIG. 15 are identical to those described with respect to the rotary embodiment of FIG. 12.

Figure 16:
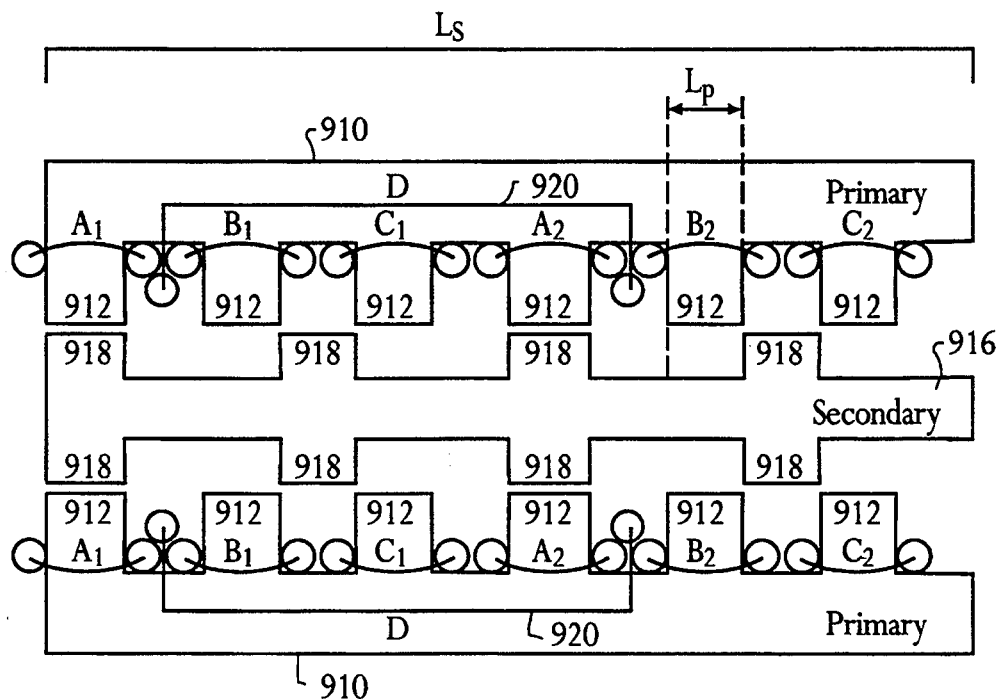
FIG. 16 illustrates an alternative embodiment of the linear variable reluctance motor section of FIG. 14.

FIG. 16 illustrates an alternative embodiment of the linear variable reluctance motor section of FIG. 14.

The section of FIG. 16 includes dual primaries 910 and 911, and a single secondary 916 positioned between dual primaries 910 and 911. The primaries 910 and 911 each have the same number of salient poles 912, and secondary 916 is provided with salient poles 918 projecting from opposing sides toward both of primaries 910 and 911. All of poles 912 have a pole width $L_{pp}$ equal to $L_s/12$, and poles 918 have a pole width $L_{ps}$ being of between $L_s/12$ to $L_s/6$ where $L_s$ equals the total length of the section. The primaries 910 and 911 are each provided with six equally spaced salient poles 912, and the secondary 916 is provided with four equally spaced salient poles 918 on each of its sides.

The embodiment of FIG. 16 is wound similarly to that of FIG. 14 such that the dual primaries 910 and 911 mirror each other.

The commutating sequence, operation, and advantages of the linear variable reluctance motor of FIG. 16 are the same as those for the embodiment of FIG. 14. The use of dual primaries 910 and 911 carry an additional benefit in that the net normal force acting on the secondary 916 is zero.

Figure 17:
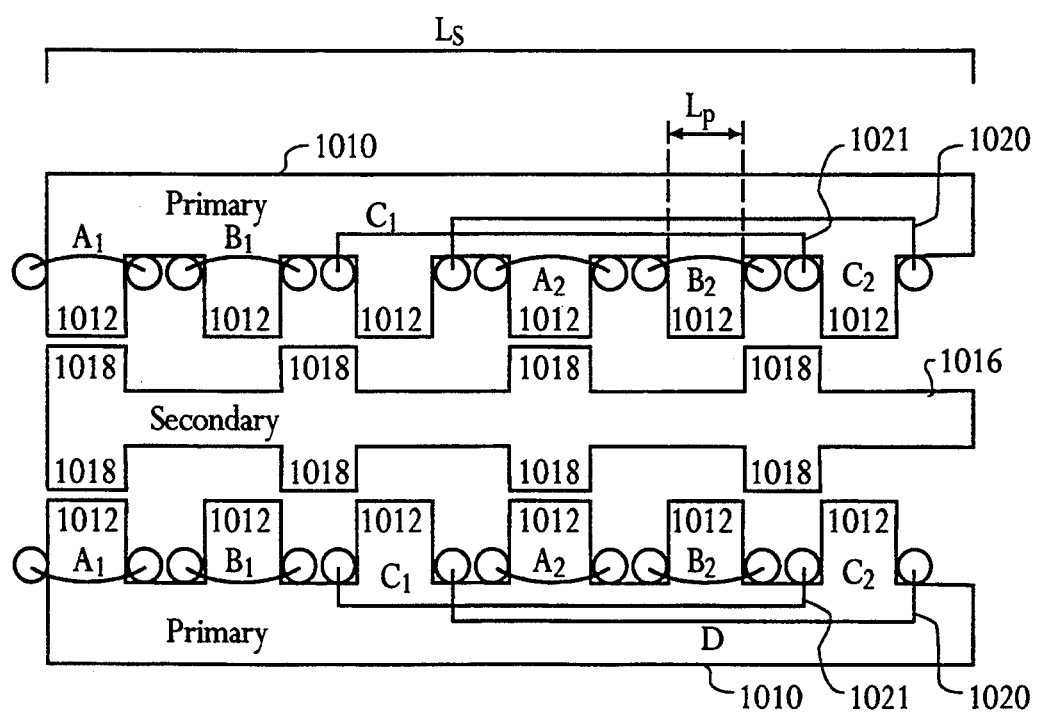
FIG. 17 illustrates one section of a linear variable reluctance motor as in FIG. 15 with the addition of dual primaries.

FIG. 17 illustrates a linear embodiment of the invention which incorporates dual primaries 1010 and 1011 in the embodiment shown in FIG. 15. Again, the use of dual primaries 1010 and 1011 eliminates any net normal force acting on the secondary 1016.

The embodiment of FIG. 17 is wound similarly to that of FIG. 15 such that the dual primaries 1010 and 1011 mirror each other.

The commutating sequence, operation, and advantages of the linear variable reluctance motor of FIG. 17 are the same as those for the embodiment of FIG. 15.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A variable reluctance motor comprising:
   a rotor having four salient poles spaced at angular intervals of $\pi/2$; and
   a stator having six salient poles spaced at angular intervals of $\pi/3$, said poles of said stator arc of $\pi/6$ and said poles of said rotor having a pole between $\pi/6$ and $\pi/3$,
   said stator further comprising,
   first and second short pitch windings corresponding to a first and a second short pitch windings comprising two coils connected each said coils being wound around one of a pair of diametric stator poles; and
   third and fourth full pitch windings, each of said full pitch windings being wound around a group of three adjacent ones of said stator poles for generating a mutual inductance between said short pitch windings and said full pitch windings said two full pitch windings corresponding to a third and a fourth phase.

2. The variable reluctance motor according to claim 1, wherein said third full pitch phase winding is wound around a first group of stator poles and said fourth full pitch phase winding is wound around a second group of three adjacent stator poles including one stator pole which is in said first group of stator poles.

3. A section of a linear variable reluctance motor, comprising:
   a secondary having four salient poles; and
   a primary having six salient poles equally spaced lengthwise, said primary and said secondary being of an equivalent length, the width of said primary poles equaling 1/12 times said length and the width of said secondary poles equaling a range of between 1/12 to 1/6 times said length.
   said primary being wound with three phase windings corresponding to three phases, each one of said phase windings comprising two single-pole coils connected in series and wound around one of a pair of primary poles,
   said primary further being wound with two multi-pole windings corresponding to a third and a fourth phase, said two multi-pole windings each being wound around a group of three primary poles.

4. The section of a linear motor according to claim 3 wherein said multi-pole winding corresponding to a third phase is wound around a first group of primary poles and said multi-pole winding corresponding to a fourth phase is wound around a second group of three adjacent primary poles including two primary poles which are included in said first group of primary poles.

5. A section of a linear variable reluctance motor, comprising:
   a first primary having six salient poles equally spaced lengthwise and a second primary having six salient poles equally spaced lengthwise, said first and second primaries being disposed in parallel with said salient poles thereof positioned opposite one another in facing relationship;
   a secondary lying between said first and second primaries and facing said first and second primaries on respective sides, said secondary having four salient poles equally spaced lengthwise on each side;
   said secondary and both said primaries being of equal length, the width of said primary poles equalling 1/12 times said length, the width of said secondary poles being in between 1/12 to 1/6 times said length;
   said first and second primaries each being wound with two single-pole windings corresponding to two phases, each one of said phase windings comprising two short pitch coils connected in series and wound around one of a pair of primary poles;
   each of said first and second primaries being wound with two multi-pole windings corresponding to a third and a fourth phase, said third and fourth multi-pole windings each being wound around a group of three primary Doles.

* * * * *

UNITED STATES PATENT AND TRADEMARK OFFICE
CERTIFICATE OF CORRECTION

PATENT NO. : 5,376,851
DATED : December 27, 1994
INVENTOR(S) : Lipo et al

It is certified that error appears in the above-indentified patent and that said Letters Patent is hereby corrected as shown below:

In claim 1, column 11, line 11, after "stator" and before "arc", insert therein -- having a pole -- .

In claim 1, column 11, line 12, after "pole" and before "between", insert therein -- arc of -- .

In claim 1, column 11, line 16, after "second" and before "short", insert therein -- phase, each one of said--.

In claim 1, column 11, line 17, after "connected" and before "each", insert therein -- in series, -- .

Signed and Sealed this

Fourteenth Day of November, 1995

*Attest:*

BRUCE LEHMAN

*Attesting Officer*    *Commissioner of Patents and Trademarks*